US009898288B2

United States Patent
Lu et al.

(10) Patent No.: US 9,898,288 B2
(45) Date of Patent: Feb. 20, 2018

(54) METHODS AND SYSTEMS FOR MANAGING AN INSTRUCTION SEQUENCE WITH A DIVERGENT CONTROL FLOW IN A SIMT ARCHITECTURE

(71) Applicant: MediaTek Inc., Hsin-Chu (TW)

(72) Inventors: Yan-Hong Lu, Hsinchu (TW); Jia-Yang Chang, Hsinchu (TW); Pao-Hung Kuo, Zhunan Township, Miaoli County (TW); Chia-Chi Chang, Zhubei (TW); Pei-Kuei Tsung, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 239 days.

(21) Appl. No.: 14/982,257

(22) Filed: Dec. 29, 2015

(65) Prior Publication Data
US 2017/0185406 A1 Jun. 29, 2017

(51) Int. Cl.
*G06F 9/30* (2006.01)

(52) U.S. Cl.
CPC ........ *G06F 9/30061* (2013.01); *G06F 9/3009* (2013.01)

(58) Field of Classification Search
None
See application file for complete search history.

(56) References Cited

U.S. PATENT DOCUMENTS

| 8,381,203 | B1* | 2/2013 | Beylin | G06F 8/458 717/149 |
| 2009/0240931 | A1* | 9/2009 | Coon | G06F 9/30054 712/234 |
| 2009/0259996 | A1* | 10/2009 | Grover | G06F 8/456 717/136 |
| 2011/0078418 | A1* | 3/2011 | Rozas | G06F 9/30058 712/220 |
| 2013/0042090 | A1* | 2/2013 | Krashinsky | G06F 9/3016 712/214 |

OTHER PUBLICATIONS

Harris, M., High Performance Computing with CUDA, 2007, NVIDIA, SC07, 88 pages.*

(Continued)

*Primary Examiner* — Eric Coleman
(74) *Attorney, Agent, or Firm* — McClure, Qualey & Rodack, LLP

(57) ABSTRACT

A computer-implemented method of executing an instruction sequence with a recursive function call of a plurality of threads within a thread group in a Single-Instruction-Multiple-Threads (SIMT) system is provided. Each thread is provided with a function call counter (FCC), an active mask, an execution mask and a per-thread program counter (PTPC). The instruction sequence with the recursive function call is executed by the threads in the thread group according to a program counter (PC) indicating a target. Upon executing the recursive function call, for each thread, the active mask is set according to the PTPC and the target indicated by the PC, the FCC is determined when entering or returning from the recursive function call, the execution mask is determined according to the FCC and the active mask. It is determined whether an execution result of the recursive function call takes effects according to the execution mask.

15 Claims, 16 Drawing Sheets

(56) References Cited

OTHER PUBLICATIONS

Huo, X. etal., Efficient Scheduling of Recursive Control Flow on GPUs, 2013, ACM, pp. 409-420.*
Nickolls, J. etal., Scalable Parallel Programming, 2008, ACM QUEUE, March/April, pp. 40-53.*
Lindholm, E. etal., NVIDIA Tesla: A Unified Graphics and Computing Architecture, 2008, IEEE, 17 pages.*
"Intel HD Graphics OpenSource Programmer Reference Manual;" vol. 4, Part 2; Feb. 2010; pp. 1-246.
Anantpur, J., et al.; "Taming Control Divergence in GPUs through Control Flow Linearization;" 23rd International Conference; 2014; pp. 1-20.

* cited by examiner

METHODS AND SYSTEMS FOR MANAGING AN INSTRUCTION SEQUENCE WITH A DIVERGENT CONTROL FLOW IN A SIMT ARCHITECTURE

FIELD OF THE INVENTION

The invention relates to control flow handling techniques, and more precisely, to single-instruction-multiple-threads (SIMT) systems, non-transitory computer readable storage mediums, and related methods for managing an instruction sequence including a divergent control flow of a single-instruction-multiple-threads (SIMT) system.

DESCRIPTION OF THE RELATED ART

Current graphics processing unit (GPU) devices use the Single Instruction Multiple Threads (SIMT) execution model. In this model, threads are grouped into warps of a constant size. For example, with warp size 8, there is one for threads 0 ... 7 and another for threads 8 ... 15. In the SIMT model, each warp is processed by executing the same instruction for all of its threads. In this respect, the SIMT model resembles typical vector computing (the SIMD model). However, all threads have their own program counter (PC), which also referred to as per-thread program counters (PTPCs). A PTPC is a multi-bit variable associated with a thread, which points to an identification number (ID) of a next basic block the thread will be active. A basic block (BB) is a code block that has only one entry point and one exit point, wherein each BB may contain multiple instructions to be executed by all of threads within a thread group and wherein the end of the BB (e.g. a location before the exit point) may contain conditional code to diverge the threads to different BBs. Thus, the processing of the threads within the thread group can differ if there is branching. In the SIMT execution model, the different progress of threads is called thread divergence.

With SIMT, there is a group of logical threads, and all threads in the same thread group execute a single common instruction on a particular cycle. For example, all the threads in a group read source operands from a register file perform the specified arithmetic operation in processing units, and write the results back to the register file. To enable control flow to diverge within the group of threads, GPUs partially serialize execution and follow a single control flow path at a time. The execution of the threads in the group that are not on the current path is masked. Most current GPUs rely on a hardware reconvergence stack (e.g., an execution stack) to track the multiple concurrent paths and to choose a single path for execution. Control flow paths are pushed onto the stack when they diverge and are popped off of the stack to enable threads to reconverge and keep lane-utilization high. The stack algorithm guarantees optimal reconvergence for applications with structured control flow as it traverses the structured control-flow tree depth first. The downside of using the reconvergence stack is that only a single path is followed, which does not maximize available parallelism, degrading performance in some cases.

Traditional re-convergence mechanisms may use the PTPCs to work efficiently for linearization. An active mask is used for indicating the active status of threads while execution. Each bit of the active mask may indicate active status of one thread (or called one lane) within a thread group which includes a group of threads. The active mask for each thread within a thread group can be generated by comparing a warp program counter (PC) for all of the threads in the same thread group with its PTPC. A warp PC (hereinafter also referred to as a program counter (PC)) points to a code address that all the threads of the thread group will be there for subsequent execution. The PC is modified, either by incrementing to the next instruction in a basic block or by updating it according to the outcome of branch instructions. When an instruction is issued, the PTPC of each thread is checked against a jump target indicated by the PC. If they match, that thread is enabled and its active mask is set to a predetermined value (e.g., 1) such that the instruction executes and produces a result. Otherwise, it is disabled and its active mask is set to another predetermined value (e.g., 0) such that the instruction does not produce a result. However, for supporting recursive function call handling, as the PC may be the same when a recursive function call with one or more iterations is executed, it needs to store the active masks for all of the threads in a stack for each iteration of the recursive function call and the bit-wise operations and stack push/pop operations for active masks are also required.

What is therefore needed is an enhanced system and a method for managing a divergent control flow with a recursive function call with SIMT architecture for improving processing efficiency when threads may diverge.

BRIEF SUMMARY OF THE INVENTION

In a first aspect of the invention, a computer-implemented method of executing an instruction sequence with a recursive function call of a plurality of threads within a thread group in a Single-Instruction-Multiple-Threads (SIMT) system is provided. The method comprises the steps of: providing each of the threads a function call counter (FCC), an active mask, an execution mask and a per-thread program counter (PTPC), wherein the PTPC for a specific thread indicates a target in the instruction sequence for the specific thread to be active; executing the instruction sequence with the recursive function call by the threads in the thread group according to a program counter (PC) indicating a target that all of the threads will jump to for subsequent execution; and upon executing the recursive function call, for each thread, setting the active mask according to the PTPC and the target indicated by the PC, determining the FCC when entering or returning from a first iteration of the recursive function call, setting the execution mask according to the FCC and the active mask and determining whether an execution result of the recursive function call takes effects according to the execution mask, wherein, for each thread, the execution result of the recursive function call in each iteration takes effect if the execution mask is set to a predetermined value and the execution result does not take effect if the execution mask is not set to the predetermined value.

In a second aspect of the invention, a computer-implemented method for handling a divergent control flow in a single instruction multiple thread (SIMT) system is provided. The method comprises the step of: receiving a linearized flow with a plurality of basic blocks (BBs) to be executed by a group of threads within a thread group, wherein in the linearized flow a first BB is followed by a second BB, the second BB is followed by a third BB and the third BB is followed by a fourth BB and a multi-way branch instruction which provides a plurality of jump targets is inserted in an end of at least the first BB in the linearized flow; and executing the plurality of BBs and instructions thereof by the threads in the thread group according to a program counter (PC), wherein the PC indicates an address in the linearized flow for all of the threads within the thread group to execute next, wherein the multi-way branch instruction, when being executed by the threads currently activated in the first BB, selects a jump target from the plurality of jump targets provided by the multi-way branch instruction and sets the PC to the selected jump target for subsequent execution of all of the threads according to execution statuses of all of the threads and the selected jump target is the jump target selected from the second BB, the third BB, the fourth BB, or a branch instruction of the second BB.

In a third aspect of the invention, a single instruction multiple thread (SIMT) system with a plurality of processors and a scheduler is provided. Each of the processors includes vector units to provide a plurality of parallel lanes for vector execution. The scheduler is configured to schedule multiple threads to each of the processors. Each of the processors is adapted to: receive a linearized flow with a plurality of basic blocks (BBs) to be executed by a group of threads within a thread group, wherein in the linearized flow a first BB is followed by a second BB, the second BB is followed by a third BB and the third BB is followed by a fourth BB and a multi-way branch instruction which provides a plurality of jump options is inserted in an end of at least the first BB in the linearized flow; and execute the plurality of BBs and instructions thereof by the threads in the thread group according to a program counter (PC), wherein the PC indicates an address in the linearized flow for all of the threads within the thread group to execute next, wherein the multi-way branch instruction, when being executed by the threads currently activated in the first BB, selects a jump target from the plurality of jump options provided by the multi-way branch instruction and sets the PC to the selected jump target for subsequent execution of all of the threads according to execution statuses of all of the threads and the selected jump target is one of the jump options selected from the second BB, the third BB, the fourth BB, or a branch instruction of the second BB.

Other aspects and features of the present invention will become apparent to those with ordinary skill in the art upon review of the following descriptions of specific embodiments of SIMT systems and non-transitory computer readable storage mediums for carrying out the method for managing a divergent control flow of a SIMT system.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

In the description hereinafter, the term "vector processing" refers to the parallel execution of multiple threads. Vector processing is performed by vector execution units (also referred to as "vector units") in a processor. When the number of threads in a thread block or a thread group is the same as the number of vector units in a processor, each vector unit provides one "vector lane" (also referred to as a "parallel lane") for vector execution. When the number of threads in a thread block or a thread group exceeds (e.g., is a multiple of) the number of vector units in a processor, each vector unit is time-multiplexed to provide multiple vector lanes. Although the threads executed by a time-multiplex vector unit are executed in multiple sequential cycles, for the purpose of this description all threads in a thread block are executed in parallel. In other words, different threads of a thread block are executed on different vector lanes in parallel.

Figure 1:
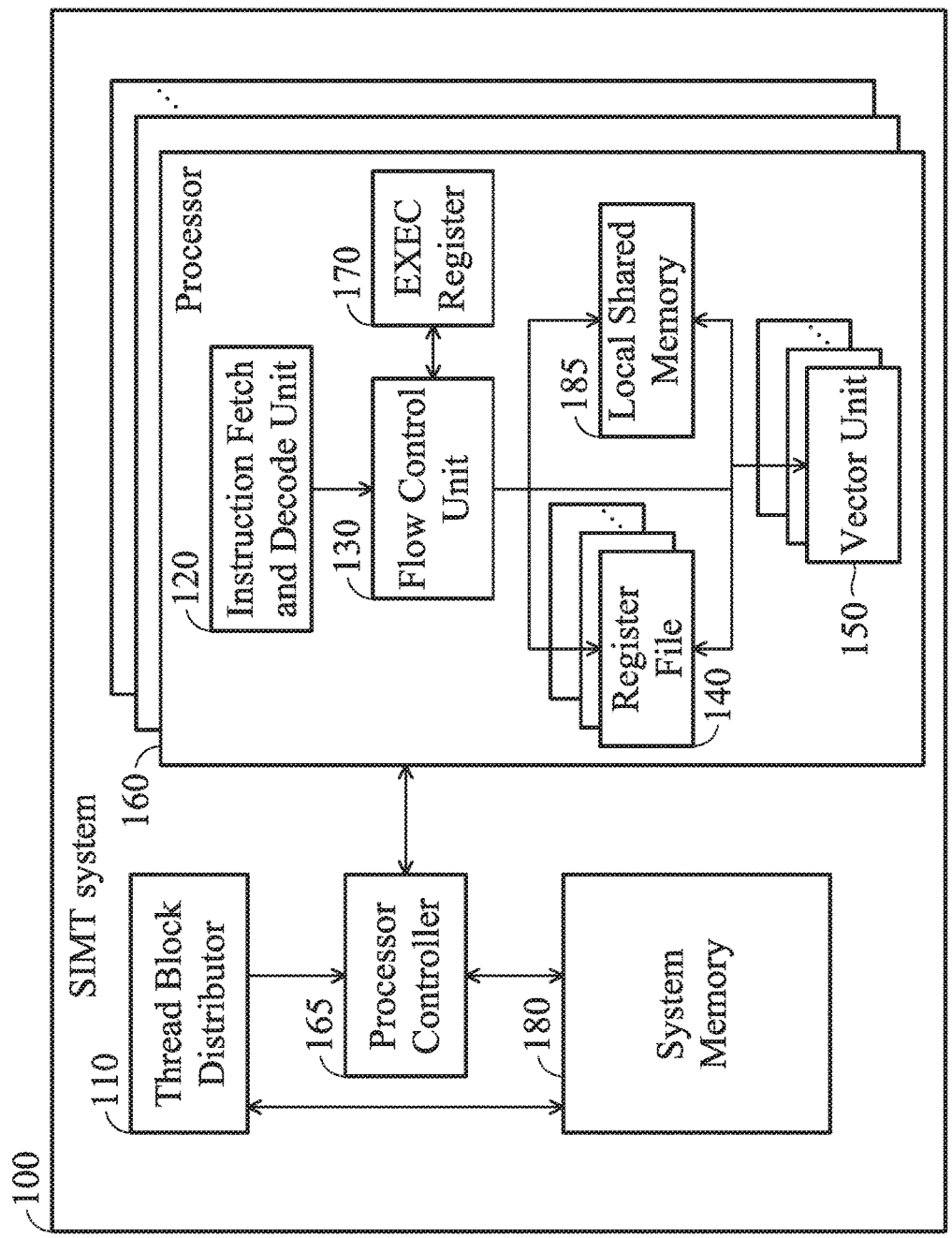
FIG. 1 is a schematic diagram illustrating an embodiment of a SIMT system of the invention.

FIG. 1 is a schematic diagram illustrating an embodiment of a SIMT system 100 of the invention. An example of the SIMT system 100 is a graphic processing unit (GPU), a multimedia processing system, a signal processing system, or any high-performance computing system.

In the embodiment of FIG. 1, the SIMT system 100 includes a plurality of processors 160, and each processor 160 includes a plurality of vector units 150. Processing tasks enters the SIMT system 100 in the form of threads organized as thread blocks or thread groups. Each processor 160 may process multiple thread blocks or thread groups concurrently. Each thread block or group contains a group of threads that share the same instruction. Each thread has its own register file 140, and shares data with other threads in the thread block via a local shared memory 185.

The SIMT system 100 also includes a thread block distributor 110, which schedules and distributes thread blocks or groups to the processors 160 via a processor controller 165. When a thread block or group is scheduled to a processor 160, the processor's instruction fetch and decode unit 120 fetches and decodes an instruction, and a control flow unit 130 schedules the instruction and the threads in the thread block or group for execution in appropriate cycles; e.g., when the source operands of the instruction for these threads become available. The source operands may include a constant, or may be fetched from the register files 140 or memory, such as system memory 180, the local shared memory 185, cache memory or other memory locations. Then the instructions along with the source operands are sent to the vector units 150 for execution.

In one embodiment, the vector units 150 provide N vector lanes for vector execution. The vector units may be time-multiplexed if the number of vector units is less than N. For example, 64 vector units may provide 128 vector lanes when each vector unit is time-multiplexed 4 times. For simplicity of the discussion, the following description refers the SIMT system 100 as providing N vector lanes in parallel. It is understood that a SIMT system may provide any number of vector lanes.

Referring again to FIG. 1, each processor 160 also includes a status register, hereinafter referred to as an EXEC register 170, which has N bits corresponding to N threads. The EXEC register 170 is used as an indicator to indicate which of the N threads are active. For example, if the i-th bit of the EXEC register 170 is set to a predetermined value, it indicates that the corresponding i-th thread is active. The EXEC register 170 may be set by a frontend unit of the processor 160; e.g., the instruction fetch and decode unit 120 or the control flow unit 130. The instructions and respective source operands fetched by the instruction fetch and decode unit 120 are then issued to the vector units 150 for vector execution.

Figure 11:
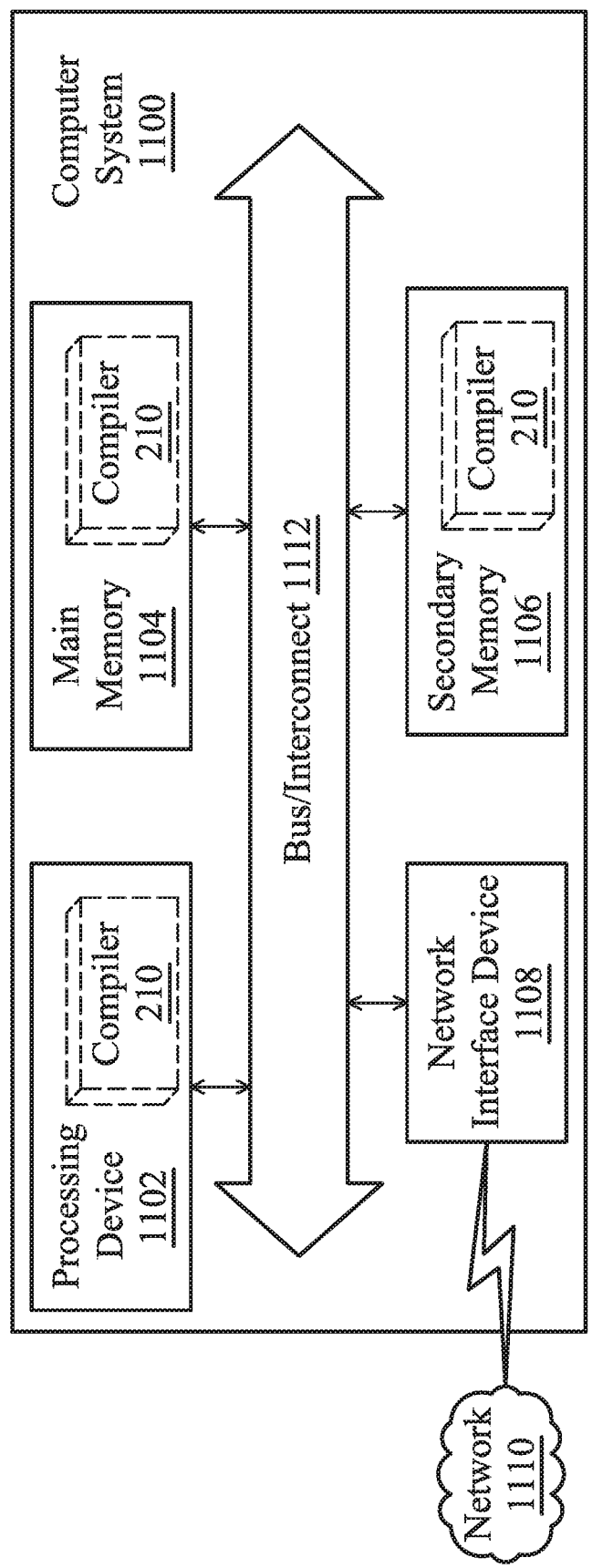
FIG. 11 is a block diagram illustrating a computer system according to an embodiment of the invention.

Linearization of a plurality of BBs in a control-flow graph is performed at compile time to schedule the BBs in order such that the BBs are executed sequentially at runtime (or execution time). The linearization can be performed at the compile time by a compiler, such as a compiler 210 of FIG. 2 according to one embodiment. The compiler 210 runs on a computer system 200, which may be different from the SIMT system 100 of FIG. 1. An example of the computer system 200 is a personal computer and the invention in not limited thereto. An example of the computer system 200 is shown in FIG. 11. The compiler 210 includes a linearization module 211 to perform analysis, e.g., static analysis, on an instruction sequence such as a computer program to linearize a plurality of BBs in a control-flow graph corresponding to an instruction sequence to derive a linearized flow for execution by a thread group which includes a group of threads. For a system having N vector lanes, the number of active threads M can be N≥M≥1. A BB is a code block that has only one entry point and one exit point.

Figure 3:
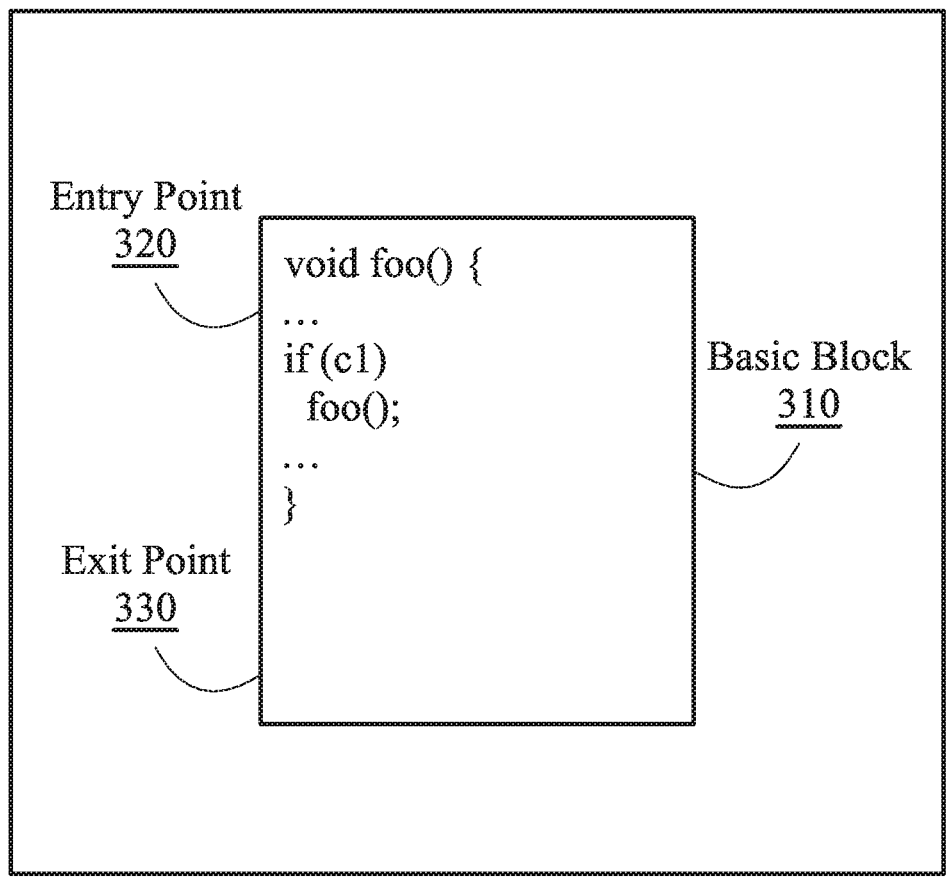
FIG. 3 is a schematic diagram illustrating an example of a BB according to an embodiment of the invention.

FIG. 3 illustrates an example of a BB according to one embodiment. In the example of FIG. 3, a BB 310 that contains instructions for a recursive function call foo( ) is presented. In the example, the BB 310 has only one entry point 320 (where the statement void foo( ) {is) and only one exit point 330 (where the} statement is). Within the basic block 310, there is a branch instruction with a branch condition that may call the function foo( ) itself for a number of times, e.g. the statement if (c1) foo( ) may call the function foo( ) itself for a number of times when a branch condition c1 has been met. The function call foo( ) is referred to as a recursive function call as because that it will call itself for a number of times when the c1 condition is met during the run-time execution (also referred to as during execution time) of the foo( ). For example, if the branch condition c1 is a statement of (A>0) and the branch instruction is a statement of if (A>0), it is determined, during the execution time, as being met and the foo( ) will be called when the value of A is greater than zero or it is determined as not being met and the foo( ) will not be called when the value of A is equal to or smaller than zero. It is understood that FIG. 3 is an example and other conditions or scenarios may exist for an instruction to be identified as having a recursive function call.

Figure 4A:
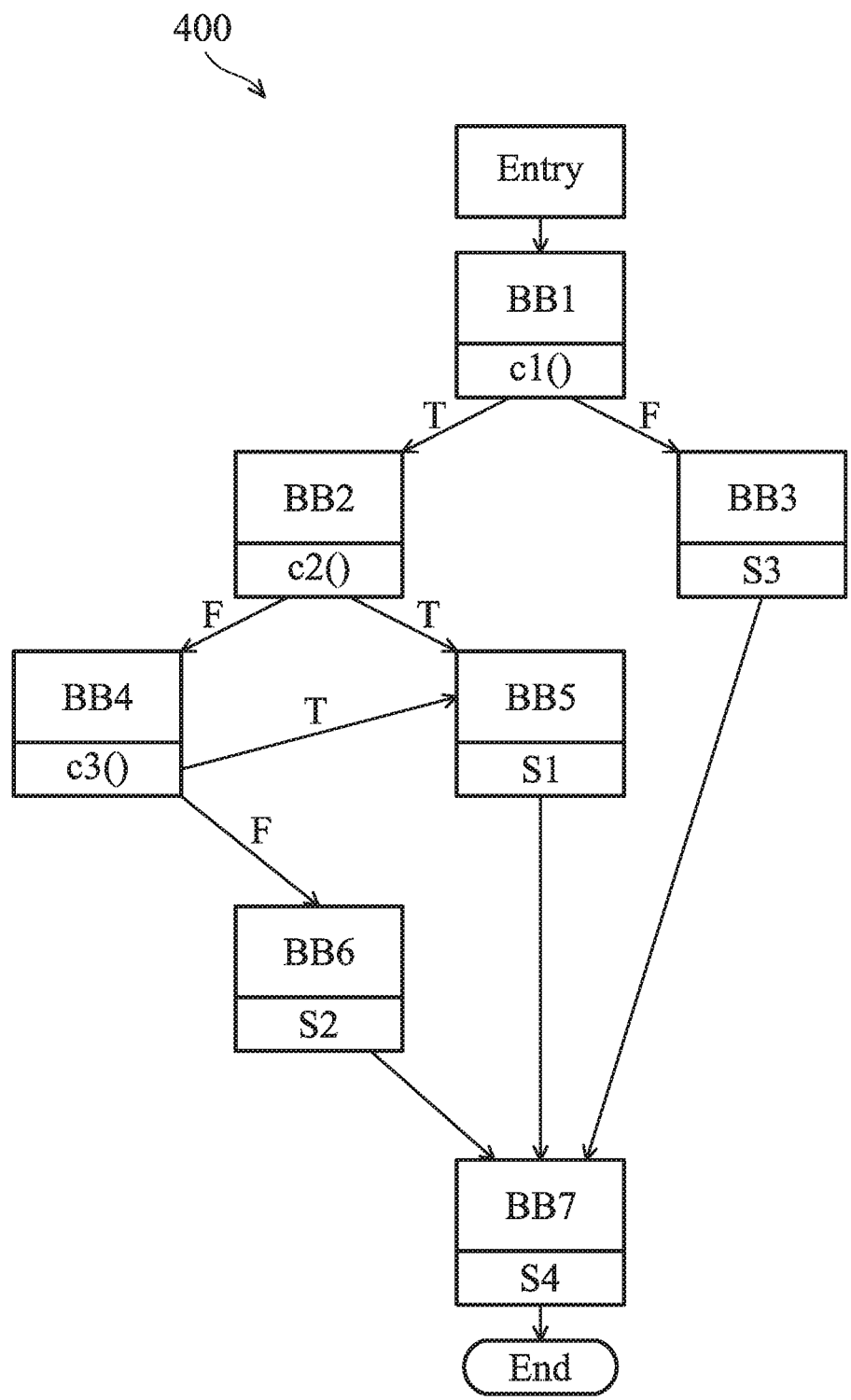
FIG. 4A is a schematic diagram illustrating an example of a control-flow graph according to an embodiment of the invention.
Figure 4B:
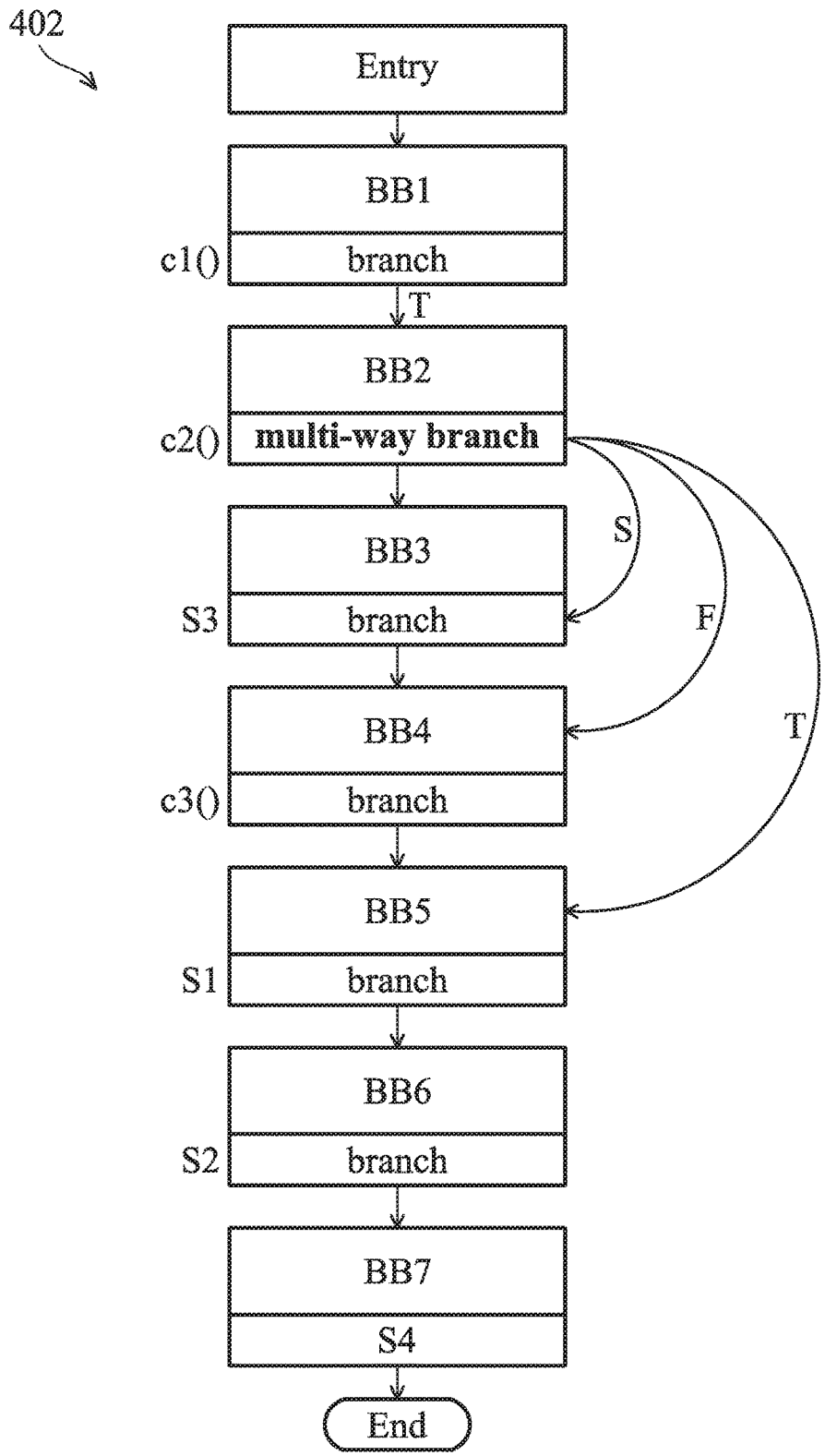
FIG. 4B is a schematic diagram illustrating a linearized flow according to the control-flow graph shown in FIG. 4A of the invention.

In some embodiments, the linearization module 211 may derive a linearized flow for execution by the threads in the thread group by arranging the BBs in an order in which successors are arranged after their predecessors, except for the back edges based on the control-flow graph. For example, FIG. 4A is a schematic diagram illustrating a control-flow graph according to an embodiment of the invention. As shown in FIG. 4A, a control-flow graph 400 is presented in which seven BBs with IDs BB1-BB7 are within the control-flow graph 400. A BB BB1 (which is the BB with an ID of BB1) is executed first and then branches to a BB BB2 and a BB BB3. After the execution of the BB BB2, the BB BB2 branches to a BB BB4 and a BB BB5. After the execution of the BB BB4, the BB BB4 branches to the BB BB5 and a BB BB6. After the execution of the BB BB3, the BB BB5 or the BB BB6, a BB BB7 is executed. In the control-flow graph 400, the BB BB1 is the predecessor of the BB BB2 or the BB BB3 (in other words, the BB BB2 or the BB BB3 is the successor of the BB BB1), the BB BB2 is the predecessor of the BB BB4 or the BB BB5 and the predecessor of the BB BB5 can be the BB BB2 or the BB BB4. Following the linearization rule that successors must be arranged after predecessors, the linearization module 211 performs linearization to arrange the BBs to derive the linearized flow for the BBs BB1-BB7. In the linearized flow, the BB BB1 is followed by the BB BB2, the BB BB2 is followed by the BB BB3 and the BB BB3 is followed by the BB BB4. The BB BB4 is followed by the BB BB5, the BB BB5 is followed by the BB BB6 and the BB BB6 is followed by the BB BB7. The linearized flow for the control-flow graph 400 is illustrated in FIG. 4B.

Figure 2:
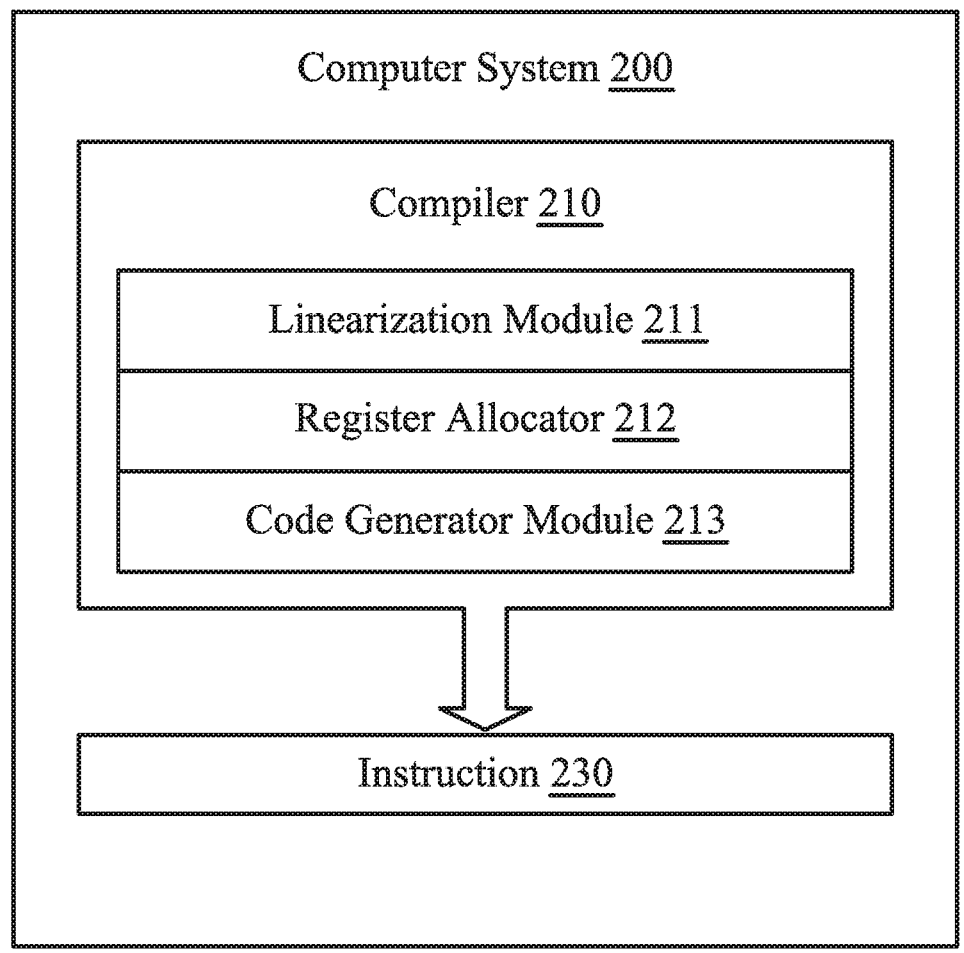
FIG. 2 is a schematic diagram illustrating an example of a compiler that generates code for an SIMT computing system according to an embodiment of the invention.

The compiler 210 of FIG. 2 further includes a register allocator 212 and a code generator module 213. When the linearization module 211 finishes the analysis and linearization on the instruction sequence, the register allocator 312 allocates registers to source and result operands of each instruction (e.g., instruction 230), and the code generator module 313 generates executable machine code for each instruction.

In some scenarios, the compiler 210 may be unable to determine whether the branch condition is met or whether the function call foo( ) is recursive if, for example, the complexity in making the determination exceeds a threshold, the determination is an undecidable or uncomputable problem, or the instruction receives or depends on unknown run-time inputs. However, the conditions that render the determination unfeasible may sometimes be resolved at the execution time. In one embodiment, the SIMT system 100 includes a runtime module (not shown), which is part of the hardware circuitry (e.g., part of the control flow unit 130) that receives an instruction after it is fetched but before it is executed. It is understood that the runtime module may be located outside the control flow unit 130 within the processor 160 in alternative embodiments.

The example control flow unit 130 described herein is merely an example that is suitable for some implementations and is not intended to suggest any limitation as to the scope of use or functionality of the environments, architectures and frameworks that may implement the processes, components and features described herein.

Generally, any of the functions described with reference to the figures may be implemented using software, hardware (e.g., fixed logic circuitry) or a combination of these implementations.

In one embodiment, a thread group which contains a group of threads that share the same instruction is provided to a processor 160 and the control flow unit 130 of the processor 160 may further provide each thread in the thread group a per-thread program counter (PTPC), an active mask and an execution mask (EXE-mask) for execution. The per-thread program counter (PTPC) is a multi-bit variable associated with each thread, which stores the address of the next BB or the ID of the next BB in the linearized flow the thread is to be active. For example, if the BB with an ID of 2 is the next BB a first thread will be activated and the BB with an ID of 3 is the next BB a second thread will be activated, the values of the PTPC of the first thread and the second thread being set to 2 and 3, respectively. The execution mask (exec-mask) is a one-bit variable associated with a thread for indicating whether the thread should be active or inactive for a currently executed BB. The execution mask for each thread may be indicated by one bit of a status register; e.g., the EXEC register 170 that has N bits, each bit corresponding to one of the N threads. An exec-mask of a thread indicated by an EXEC bit that is set to a predetermined value (e.g., one) indicates that the corresponding thread is an active thread. For example, when the exec-mask of a thread is 1, the thread is active for the currently executed BB; otherwise, it is inactive for the currently executed BB. A program counter (PC) indicates the address in the instruction sequence all the threads should go to and the PTPC indicates the address in the instruction sequence each thread should go to. The PTPC of each thread can be set according to conditional code or some comparison results after the conditional code in the end of the currently executed BB has been executed.

To be more specific, the control flow unit 130 may store a function call counter (FCC) and the PTPC to handle a SIMT instruction sequence which has a recursive function call. It should be noted that the FCC can be configured on the register file 140 or the control flow unit 130.

As aforementioned, a recursive function call refers to a function call that may call itself for one or more times. Each time the recursive function call calls itself is also referred to as an iteration of the recursive function call or a recursive call iteration. In other words, a recursive function call may have one or more iterations or recursive call iterations. The FCC of a thread (or a lane) is used to record its active status, i.e., whether it is active or inactive, in each iteration of the recursive function call, wherein it can be varied during execution of each iteration of the recursive function call.

Figure 5:
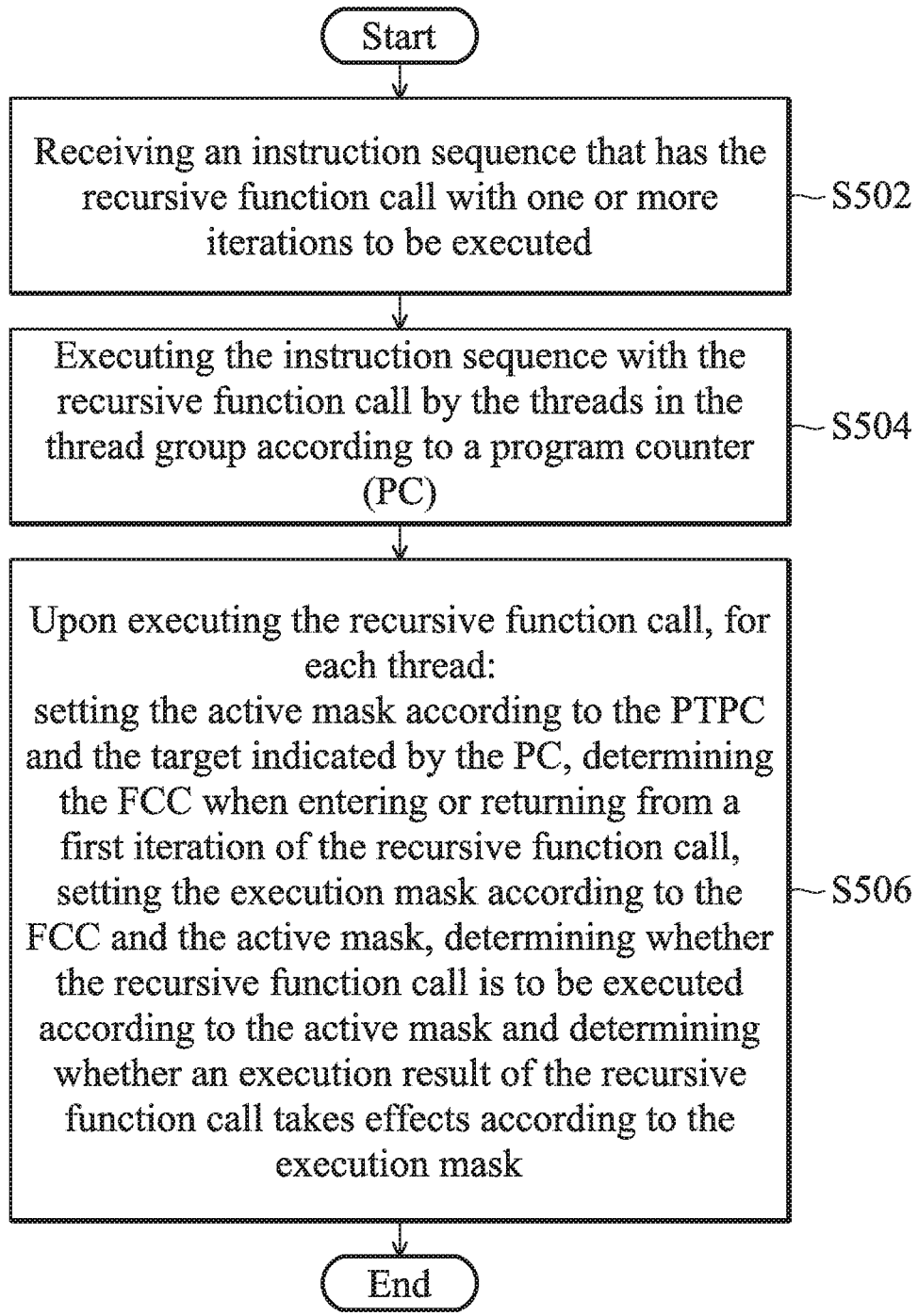
FIG. 5 is a flowchart of an embodiment of a method for executing an instruction sequence with a recursive function call of multiple threads for execution in a processor of an SIMT system of the invention.

FIG. 5 is a flowchart of an embodiment of a method for executing an instruction sequence with a recursive function call of multiple threads for execution in a processor of an SIMT system (e.g., the SIMT system 100 of FIG. 1) of the invention. The method may be performed by each processor of the SIMT system 100. The processor includes vector units providing N parallel lanes for vector execution of the N threads, where 1≤N. In this embodiment, it is assumed that an instruction sequence with a control-flow graph including multiple BBs is to be executed by all threads in a thread group. The control-flow graph is provided with a recursive function call and the recursive function call may have one or more iterations during execution time.

In this embodiment, each of the N threads is provided with a function call counter (FCC), an active mask, an execution mask and a per-thread program counter (PTPC), wherein the PTPC for a specific thread points to an identification number (ID) of a basic block that the specific thread is to be active for subsequent execution and the active mask for the specific thread is used for indicating whether the thread is active or inactive during execution time.

The FCC is reset to a value of zero for each thread at initial. The method begins when the SIMT system (more specifically, the runtime module of control flow unit 130) receives, during the execution time, an instruction sequence that has the recursive function call with one or more iterations to be executed in the processor of the SIMT system (step S502) and executes the instruction sequence with the recursive function call by the threads in the thread group according to a program counter (PC) indicating a target that all of the threads will jump to for subsequent execution (step S504). Upon executing the recursive function call, for each thread, the SIMT system sets the active mask according to the PTPC and the target indicated by the PC, determines the FCC when entering or returning from a first iteration of the recursive function call, sets the execution mask according to the FCC and the active mask, determines whether the recursive function call is to be executed according to the active mask and determines whether an execution result of the recursive function call takes effects according to the execution mask (step S506).

To be more specific, the FCC associated with each thread may be changed when entering a recursive call iteration or when returning from a recursive call iteration. In some embodiments, it is determined whether to increase the FCC according to the FCC and the active mask when entering a recursive call iteration and determined whether to decrease the FCC according to the FCC when returning from a recursive call iteration for each thread. For each thread, when entering a recursive call iteration and if the active mask is zero or if the FCC is greater than zero, then the FCC is increased (e.g., increased by 1 or a predetermined value). When returning from one recursive call iteration and if the FCC is greater than zero, then the FCC is decreased (e.g., decreased by 1 or a predetermined value). For example, if the FCC and the active mask of a first thread are both set to zero and the first thread enters to a first recursive call iteration (or a first iteration of the recursive function call), the FCC of the first thread is increased to 1 due to that the active mask of the first thread is zero. When returning from the first recursive function call iteration, as the FCC of the first thread is greater than zero, the FCC of the first thread is decreased to 0.

The active mask for each thread may be set according to its PTPC and a jump target indicated by the PC for all of the threads. In some embodiments, the active mask for a first thread is set to 1 if the jump target is equal to the PTPC of the first thread and the active mask is set to 0 if the jump target is not equal to the PTPC of the first thread. For example, if the jump target is the BB BB1 and the PTPC is the BB BB1, the active mask is set to 1 as the jump target is equal to the PTPC. Contrarily, if the jump target is the BB BB2 and the PTPC is the BB BB1, the active mask is set to 0 due to that the jump target is not equal to the PTPC.

After the FCC and the active mask are set, the exec-mask associated with each thread is set according to its FCC and its active mask. The execution result of each iteration takes effect if the execution mask is set to a predetermined value (e.g., a value of 1) and the execution result does not take effect if the execution mask is not set to the predetermined value (e.g., a value of 0).

In one embodiment, the exec-mask for each thread may be set according to the active mask and a determination of whether the FCC is equal to zero. The exec-mask is set to the active mask if the FCC is equal to zero and the exec-mask is set to zero if the FCC is not equal to zero.

Figure 6:
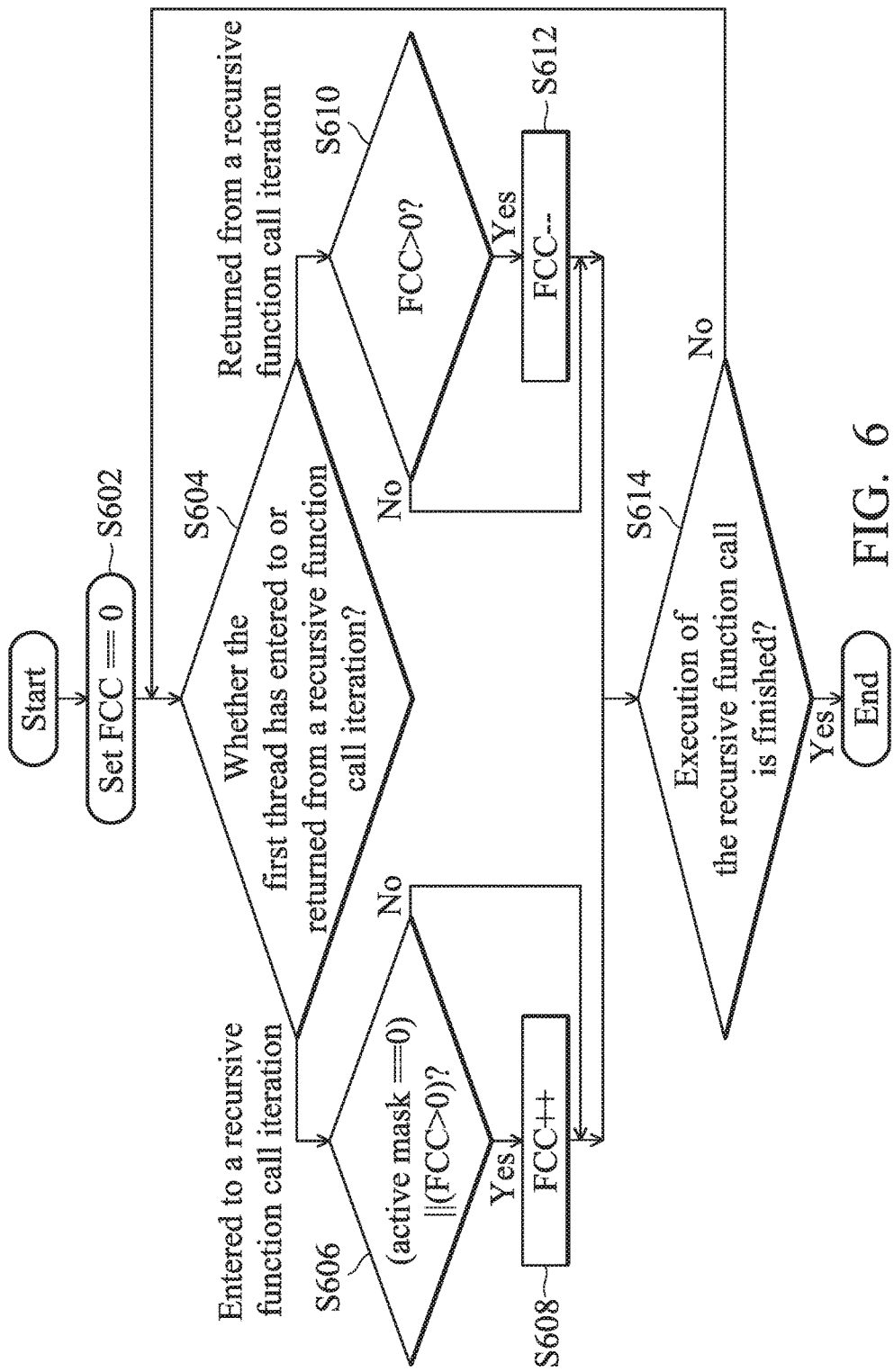
FIG. 6 is a flowchart of another embodiment of a method for executing an instruction sequence with a recursive function call of multiple threads for execution in a processor of an SIMT system of the invention.

FIG. 6 is a flowchart of another embodiment of a method for executing an instruction sequence with a recursive function call of multiple threads for execution in a processor of an SIMT system (e.g., the SIMT system 100 of FIG. 1) of the invention. Please refer to FIGS. 1 and 6. The method can be applied to an electronic device with the SIMT architecture. For example, the method can be applied to each processor 160 of the SIMT system 100 and performed by the control flow unit 130 of FIG. 1. It should be understood that, although only operation of a first thread is described, the method can be applied to any of the threads in the thread group.

First, the FCC value for a first thread is set to 0 (i.e., FCC=0) at initial (step S502). During the execution of the recursive function call, it is determined whether the first thread has entered to or returned from a recursive function call iteration (step S604). If the first thread is determined as entering to a recursive function call iteration in step S604, steps S606 and S608 are performed. If the first thread is determined as returning from a recursive function call iteration in step S604, steps S610 and S612 are performed.

When the first thread is determined as entering to a recursive function call iteration in step S604, in step S606, it is further determined whether the active mask of the first thread is equal to zero or whether the FCC of the first thread is greater than zero (i.e., (active mask==0)||(FCC>0)). If the active mask of the first thread is equal to zero or the FCC of the first thread is greater than zero (Yes in step S606), the FCC of the first thread is increased by one (i.e., FCC++) (step S608) and step S614 is performed. If the answer is negative in step S606 (No in step S606), step S614 is performed.

When the first thread is determined as returning from a recursive function call iteration in step S604, in step S610, it is determined whether the FCC of the first thread is greater than zero (i.e., FCC>0). If the FCC of the first thread is greater than zero (Yes in step S610), the FCC of the first thread is decreased by one (i.e., FCC−−) (step S612) and step S614 is performed. In step S614, it is determined whether the execution of the recursive function call is finished by checking whether call stack is empty and if so, the method ends. If the execution of the recursive function call is not finished (No in step S614), the method goes back to step S604 to recheck whether the first thread has entered to or returned from another recursive function call iteration and update the FCC, active mask and exec-mask of the first thread if needed.

Taking a pseudo C code Code_1 as following as an example, the pseudo C code Code_1 is:

```
void main ( ) {
    S0; //the jump target is BB1
    foo( );
    S1; //the jump target is BB2
}
void foo( ) {
    S2; //the jump target is BB3
    if(c1) //the jump target is BB4
```

```
        foo( );
    S3; //the jump target is BB5
}
```

In this example pseudo C code Code_1, all threads will start with main function block main( ) and then a recursive function call foo( ) will be executed in the main( ). The function call foo( ) is referred to as a recursive function call as because that it will call itself for a number of times when a c1 condition is met during the run-time execution (or during execution time) of the foo( ).

FIGS. 7A to 7E are schematic diagrams illustrating the changes in the PTPCs, the FCCs and the stack content during the execution of the example pseudo C code Code_1 according to an embodiment of the invention. It should be note that, in the following embodiments, according to the design of the pseudo C code Code_1, the PTPC for a thread will be set as the BB3 when the thread meets the c1 condition while the PTPC for a thread will be set as the BB5 when the thread fails the c1 condition during executing the recursive function call foo( ). Moreover, the method of FIG. 6 is applied to four threads th0, th1, th2 and th3 to determine their FCCs and exec-masks during the execution of the recursive function call (i.e., the function foo( )).

Figure 7A:
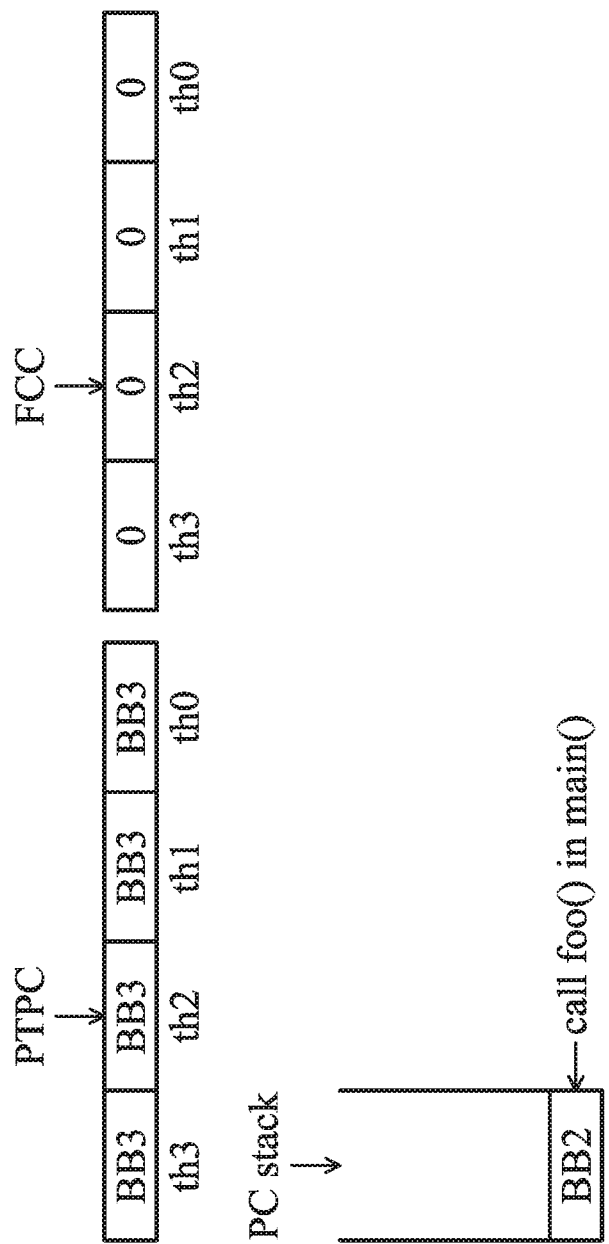
FIGS. 7A to 7E are schematic diagrams illustrating the changes in the PTPCs, the FCCs and the stack content during the execution according to an embodiment of the invention.

In FIG. 7A, the PTPCs of threads th3, th2, th1 and th0 are set to BB3, BB3, BB3 and BB3, respectively and their FCCs are all set to 0 at initial. When the foo( ) in the main( ) is being called, as all the threads will enter the main( ), the active masks of threads th3, th2, th1 and th0 are 1, 1, 1 and 1, respectively, and a return PC, i.e., the BB2, is pushed into the stack.

Figure 7B:
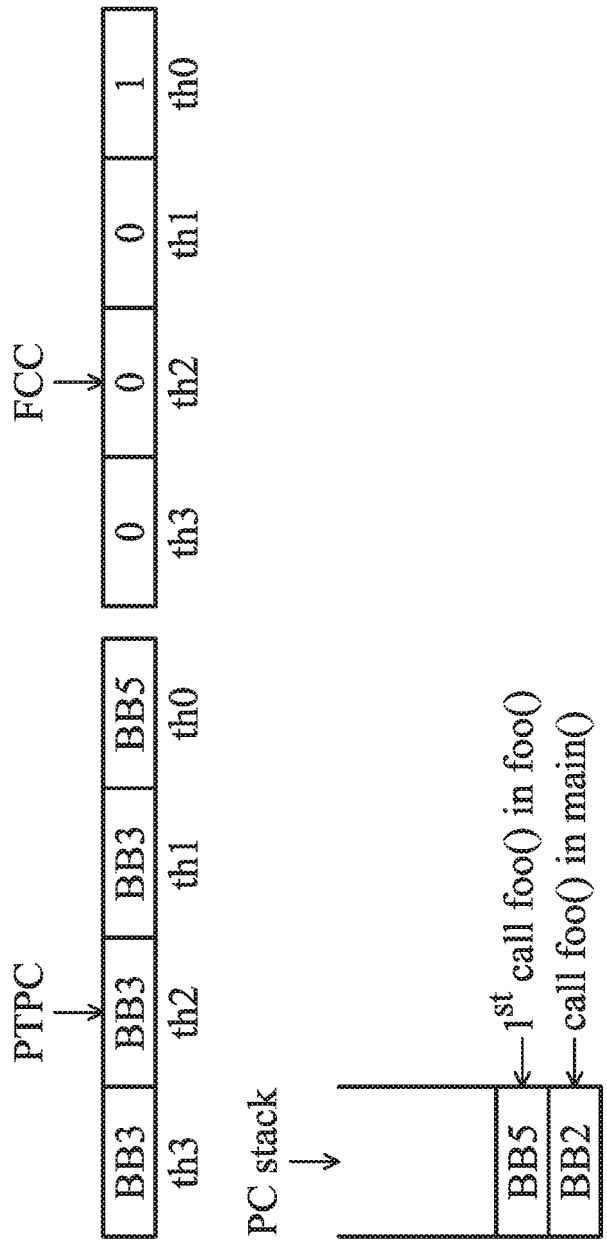

Then, in FIG. 7B, if the foo( ) is called by itself at the first time in the foo( ) and the thread th0 fails the c1 condition in the first recursive call in foo( ), the PTPCs of threads th3, th2, th1 and th0 are set to BB3, BB3, BB3 and BB5, respectively, and the active masks of threads th3, th2, th1 and th0 change to 1, 1, 1 and 0, respectively. Meanwhile, as the active mask for the thread th0 is zero, the FCCs of threads th3, th2, th1 and th0 change to 0, 0, 0 and 1, respectively. The return PC, i.e., the BB5, is pushed into the stack.

Figure 7C:
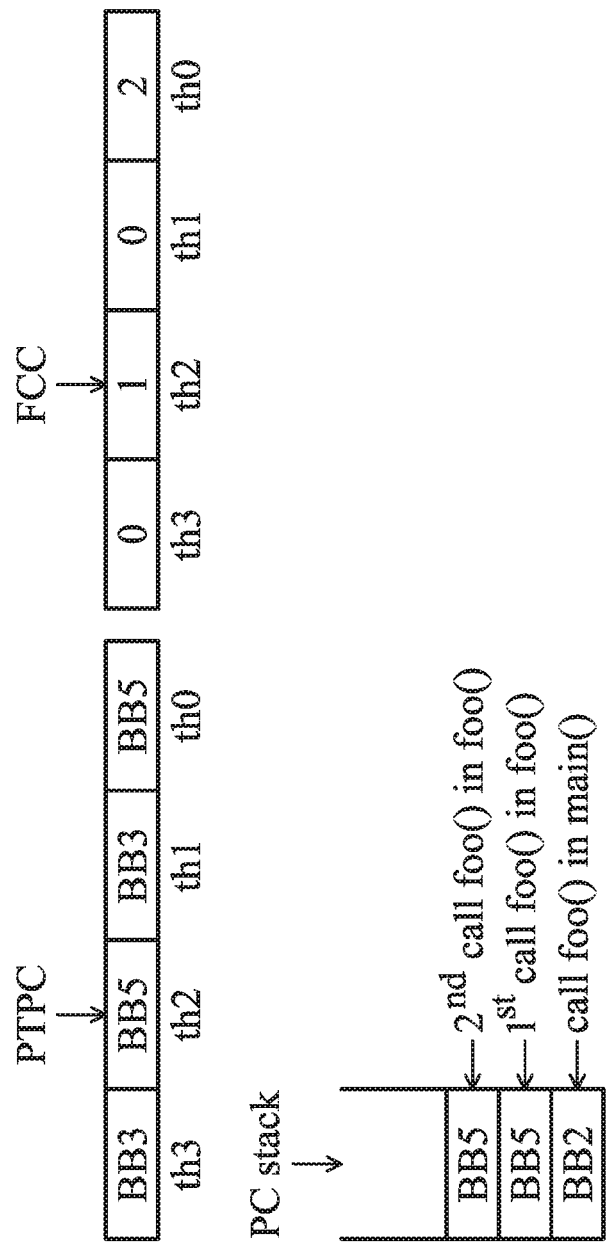

In FIG. 7C, if the foo( ) is again called by itself for the second time in the foo( ) and the thread th2 fails the c1 condition in the second recursive call foo( ) in foo( ), the PTPCs of threads th3, th2, th1 and th0 are set to BB3, BB5, BB3 and BB5, respectively and thus the active masks of threads th3, th2, th1 and th0 are 1, 0, 1 and 0, respectively. As the FCC for the thread th0 is greater than zero and the active mask for the thread th2 is zero, the FCCs of threads th3, th2, th1 and th0 are 0, 1, 0 and 2, respectively. And, the return PC, i.e., the BB5, is pushed into the stack.

Figure 7D:
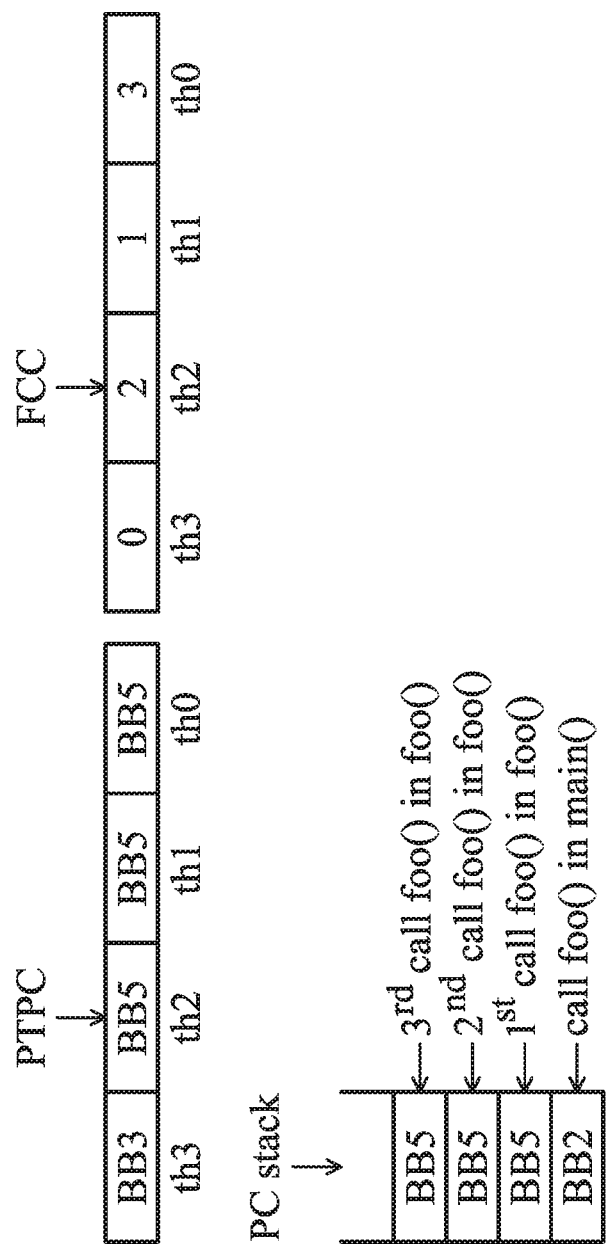

In FIG. 7D, if the foo( ) is again called by itself for the third time in the foo( ) and the thread th1 fails the c1 condition in the third recursive call foo( ) in foo( ), the PTPCs of threads th3, th2, th1 and th0 are set to BB3, BB5, BB5 and BB5, respectively and thus the active masks of threads th3, th2, th1 and th0 are 1, 0, 0 and 0, respectively. As the FCCs for the threads th0 and th2 are both greater than zero and the active mask for the thread th1 is zero, the FCCs of threads th3, th2, th1 and th0 change to 0, 2, 1 and 3, respectively. And, the return PC, i.e., the BB5, is pushed into the stack.

Figure 7E:
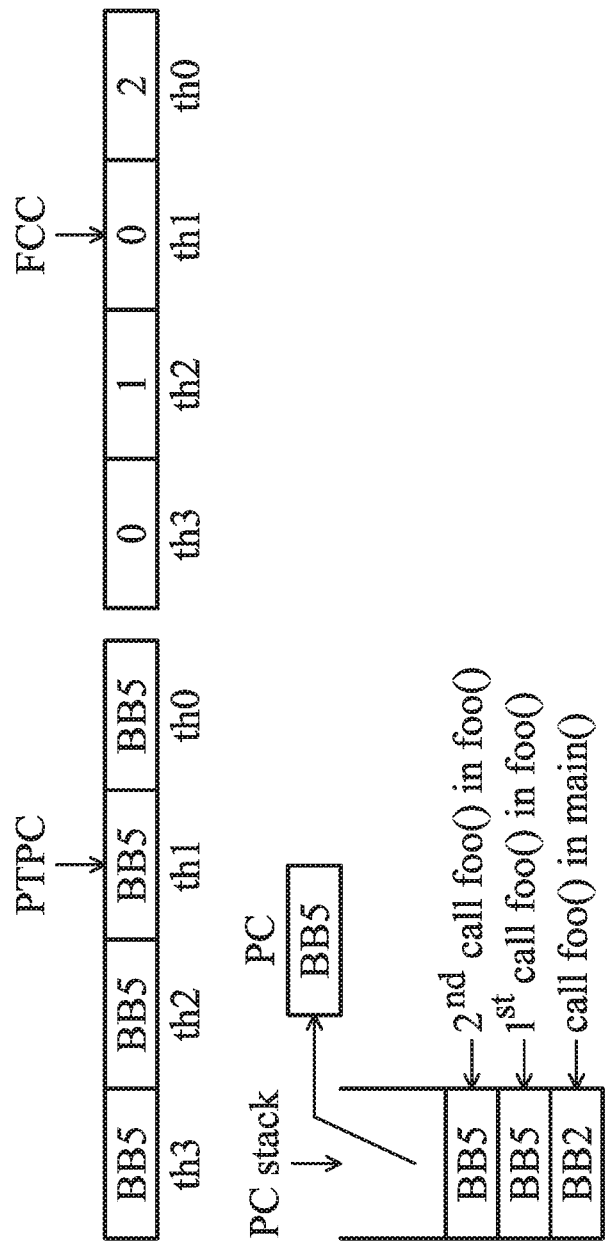

In FIG. 7E, when returning from the third recursive call foo( ) in foo( )(that is, the thread th3 also fails the c1 condition in the fourth recursive call foo( ) in foo( ), the PTPCs of threads th3, th2, th1 and th0 are set to BB5, BB5, BB5 and BB5, respectively. The PC is set to the return PC (i.e., the BB5) that is popped from the top of the stack and thus the active masks of threads th3, th2, th1 and th0 are 1, 1, 1 and 1, respectively. This means that execution of the threads th0 to th3 will be performed during this recursive call iteration. However, it is further determined whether the execution result of a thread takes effect according to its exec-mask. The exec-mask for each thread can be set according to the active mask and a determination of whether the FCC is equal to zero. It is further determined whether the FCCs of the threads th0-th3 are greater than zero. If any of the threads with a FCC value that is not zero, its FCC value will be decreased. In this example, as the FCC values for the threads th2, th1 and th0 are greater than zero, thus their FCC values will be decreased to 1, 0, and 2, respectively such that the exec-mask for the thread th1 is set to one and others are set to zero. For the threads th2, th1 and th0, as only the exec-mask for the thread th1 is set to one so that only the execution result of the thread th1 takes effect even if some of the threads (e.g., the threads th2 and th0 in this example) are incorrect executed in this iteration. Therefore, with the use of the FCC above-mentioned, the recursive function call handling can be perfectly performed.

It should be appreciated that the present invention only needs to store a return PC in each recursive call iteration and thus there is no need to store an active mask in each recursive call iteration for the recursive function call.

In view of the forgoing, it should be appreciated that the present invention realizes improved recursive function call handling in a SIMT system by using the FCC for each thread to avoid the stack and logic operations of the active mask required in the recursive function call. Advantageously, this greatly reduces the stack space needed for the recursive function call.

Figure 8:
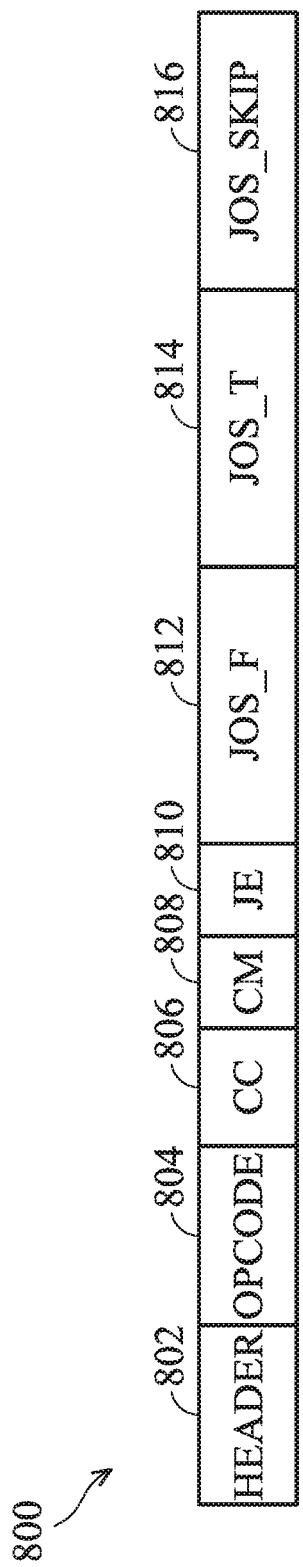
FIG. 8 is a schematic diagram illustrating a format of a multi-way branch instruction with three jump targets according to an embodiment of the invention.

According to another embodiment of the invention, a multi-way branch instruction is further provided to replace with some branch instructions in the end of some BBs within a linearized control flow to provide an optimization for branch divergence for BB linearization at the compile time. In some embodiments, a multi-way branch instruction with three jump targets may be provided. FIG. 8 is a schematic diagram illustrating a format of a multi-way branch instruction 800 with three jump targets according to an embodiment of the invention. It should be understood that the components and the number of jump targets described in the embodiment of FIG. 8 are for illustrative purposes only and are not intended to limit the scope of the invention.

As shown in FIG. 8, the multi-way branch instruction 800 may have a number of fields, including a HEADER field 802, an OPCODE field 804, a CC field 806, a CM field 808, a JE field 810, a JOS_F field 812, a JOS_T field 814 and a JOS_SKIP field 816. In one embodiment, for example, the HEADER field 802 is an eight-bit variable for ISA decoding in which the content of which is implementation dependent and the OPCODE field 804 is a three-bit variable to indicate whether the instruction is a branch, call or ret instruction. The CC field 806 is a three-bit variable to indicate the condition code type and the CM field 808 is a one-bit variable as a condition modifier to indicate whether to bypass or reverse the condition code for further optimization. The condition code type can be one of a local condition call (LCC) and a global condition code (GCC). The so-called condition code refers to a comparison result for a comparing (for example, it can be TRUE (1) or FALSE (0)). The comparison result of the LCC can't be shared between the threads while the comparison result of the GCC can be shared between the threads. For example, a statement of "if (a>b)" is a LCC and the comparison result can't be shared between the threads. In another example, a statement of "for (i=0; i<10; i++)" is a GCC and all threads share the comparison result of i, so that the comparison result can be shared between the threads.

The JOS_F field 812, the JOS_T field 814 and the JOS_SKIP field 816 are sixteen-bit variables for indicating three jump target offsets, respectively, wherein the JOS_F field 812 indicates a first jump target offset that is a jump offset to BB of if-false condition (i.e., an IFB BB), the JOS_T field 814 indicates a second jump target offset that is a jump offset to BB of if-true condition (i.e., an ITB BB) and the JOS_SKIP field 516 indicates a third jump target offset that is a jump offset to skip the next BB in the linearized control flow. The ITB BB refers to the BB that those threads which are met with the branch condition (e.g., the if-true condition) should be executed next when executing the conditional branch. The IFB BB refers to the BB that those threads which do not meet the branch condition (e.g., the if-false condition) should be executed next after the conditional branch is executed. To be more specific, the PC of the thread genuinely active in the ITB BB is set to an ID of the ITB BB while the PC of the thread genuinely active in the IFB BB is set to an ID of the IFB BB. The start address of the IFB-BB can be obtained by a summation of the current PC and the offset indicated by the JOS_F field 812. The start address of the ITB BB can be obtained by a summation of the current PC and the offset indicated by the JOS_T field 814. The address after the next BB can be obtained by a summation of the current PC and the offset indicated by the JOS_SKIP field 816. The address after the next BB also refers to the address for the branch instruction in the next BB.

For example, in one embodiment, if current PC is 233 and the multi-way branch instruction 800 with a value of 650 in the JOS_T field 814, a value of 417 in the JOS_F field 812 and a value of 205 in the JOS_SKIP field 816, the start address of the ITB BB=233+650=883, the start address of the IFB BB=233+417=650 and the address after the next BB=233+205=438. When being executed during execution time, the multi-way branch instruction 800 can determine a selected jump target according to execution status of each thread during the execution of the multi-way branch instruction 800. To be more specific, for example, for a first thread, if an if-true condition is met, the execution status of the first thread will indicate that the first thread will be genuinely activated in the ITB BB and it will indicate that the first thread will be genuinely activated in the IFB BB if an if-false condition is met.

Figure 9:
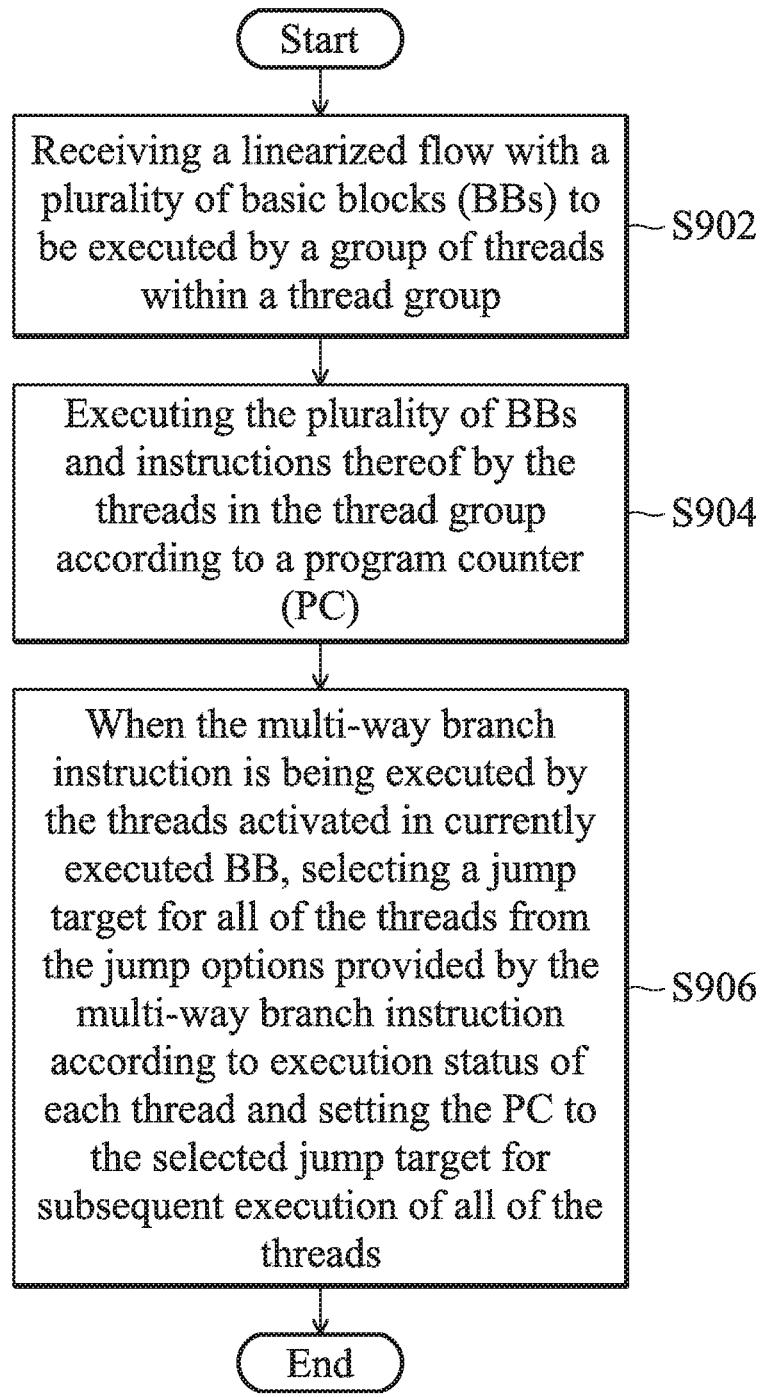
FIG. 9 is a flowchart of another embodiment of a method for managing an instruction sequence with a divergent control flow of multiple threads for execution in a processor of an SIMT system of the invention.

FIG. 9 is a flowchart of another embodiment of a method for managing an instruction sequence with a divergent control flow of multiple threads for execution in a processor of an SIMT system (e.g., the SIMT system 100 of FIG. 1) of the invention Please refer to FIGS. 1 and 9. The method can be applied to an electronic device with the SIMT architecture, such as a PDA (Personal Digital Assistant), a smartphone, a mobile phone, an MID (Mobile Internet Device), a laptop computer, a car computer, a digital camera, a multi-media player, a game device, or any other type of mobile computational device, however, it should be understood that the invention is not limited thereto. For example, the method can be applied to each processor 160 of the SIMT system 100 and performed by the control flow unit 130 as shown in FIG. 1. In this embodiment, it is assumed that an instruction sequence with a control-flow graph with multiple BBs is to be executed by all threads in a thread group. In this embodiment, a linearized flow of the BBs is provided, which can be derived by a compiler (e.g., the compiler 210) by arranging the BBs in an order in which successors are arranged after their predecessors, except for the back edges based on the control-flow graph. Furthermore, a branch instruction may be inserted into the end of some of BBs so that the threads may know where to branch to or go next for execution.

The method begins when the SIMT system (more specifically, the runtime module of control flow unit 130) receives, during execution time, a linearized flow with a plurality of basic blocks (BBs) to be executed by a group of threads within a thread group (step S902) and executes the plurality of BBs and instructions thereof by the threads in the thread group according to a program counter (PC) (step S904), wherein the PC indicates an address in the linearized flow for all of the threads within the thread group to execute next.

For example, the linearized flow 402 for the control-flow graph 400 illustrated in FIG. 4B can be provided. As shown in the linearized flow 402 of FIG. 4B, following the linearization rule that successors must be arranged after predecessors, the BB1 is followed by the BB2, the BB2 is followed by the BB3 and the BB3 is followed by the BB4. The BB4 is followed by the BB5, the BB5 is followed by the BB6 and the BB6 is followed by the BB7.

In the linearized flow 402, for a specific BB in the linearized flow, during the compiler time, a multi-way branch instruction is inserted in the end of the specific BB. For example, for the BB2, a multi-way branch instruction (e.g., the multi-way branch instruction 800 as shown in FIG. 8) is inserted in the end of the BB2, as shown in FIG. 4B.

In this embodiment, in the linearized flow, the first BB is followed by the second BB, the second BB is followed by the third BB and the third BB is followed by the fourth BB. For example, the first, second, third and fourth BBs are the BBs BB2, BB3, BB4 and BB5 as shown in FIGS. 4A and 4B, respectively. In this embodiment, as there is a conditional branch or a branch instruction (e.g., an if-else determination) with a branch condition in the end of the first BB (i.e., the BB2), some or all of the threads which meet the branch condition will be branched to the fourth BB (i.e., the BB5) for subsequent execution and some or all of threads which do not meet the branch condition will be branched to the third BB (i.e., the BB4) for subsequent execution after the execution of the conditional branch. In the following embodiments, for illustration purposes, those threads which meet the branch condition and will be branched to the fourth BB for subsequent execution are also referred to as the threads genuinely activated in the fourth BB. Similarly, those threads which do not meet the branch condition and will be branched to the third BB for subsequent execution are also referred to as the threads genuinely activated in the third BB. For example, if the branch condition in the end of the first BB is a statement of if (A>0), a thread th0 will be genuinely activated in the fourth BB when the value of A in the thread th0 is greater than 0 or it will be genuinely activated in the third BB when the value of A in the thread th0 is equal to or smaller than 0.

When the multi-way branch instruction is executed by the threads activated in the currently executed BB (i.e., the BB2), i.e., during execution time, the multi-way branch instruction selects a jump target for all of the threads from the jump options provided by the multi-way branch instruction according to execution status of each thread and sets the PC to the selected jump target for subsequent execution of all of the threads (step S906). The multi-way branch instruction may set the PC to the selected jump target such that all of the threads jump to the BB or a specific code address corresponding to the selected jump target for subsequent execution. In this embodiment, the multi-way branch instruction inserted in the end of the first BB may provide four jump options and wherein the selected jump target is the jump options selected from the second BB (i.e., the BB3), the third BB, the fourth BB, or a branch instruction of the second BB BB3. The third BB is selected as the selected jump target if the execution statuses of all of the threads indicate that all of the threads will be genuinely activated in the third BB for subsequent execution. The fourth BB is selected as the selected jump target if the execution statuses of all of the threads indicate that all of the threads will be genuinely activated in the fourth BB for subsequent execution.

The second BB is selected as the selected jump target if the execution statuses of all of the threads indicate that at least one of the threads will be genuinely activated in the second BB for subsequent execution. In other words, at least one of the threads will be genuinely activated in the second BB so that the execution of the second BB BB3 can't be skipped for subsequent execution.

The branch instruction of the second BB is selected as the selected jump target if the execution statuses of all of the threads indicate that all of the threads will be genuinely activated in the fourth BB or the third BB for subsequent execution. In other words, none of the threads will be genuinely activated in the second BB so that the execution of the second BB can be skipped to the branch instruction of the second BB for subsequent execution. By doing so, the number of branch instructions to be executed can be reduced, thus minimizing the branch latency.

Figure 10:
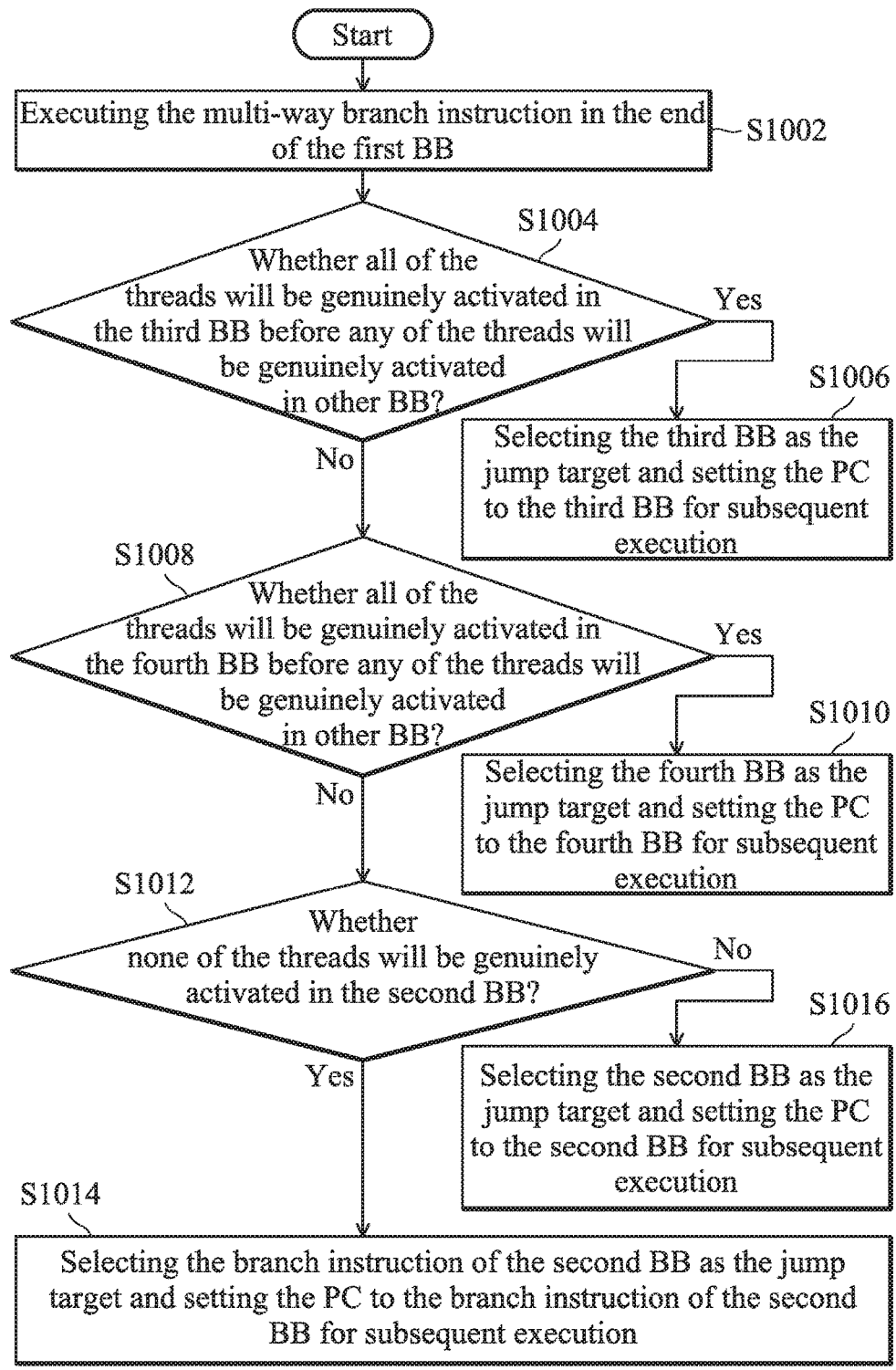
FIG. 10 is a flowchart of another embodiment of a method for managing an instruction sequence with a divergent control flow of multiple threads for execution in a processor of an SIMT system of the invention.

FIG. 10 is a flowchart of another embodiment of a method for handling a divergent control flow in a SIMT system of the invention. Please refer to FIGS. 1 and 10. The method for handling a divergent control flow in a SIMT system can be applied to an electronic device with the SIMT architecture. For example, the method can be applied to the SIMT system 100 and performed by the control flow unit 130 as shown in FIG. 1. In this embodiment, the linearized flow 402 shown in FIG. 4B is used, wherein a multi-way branch instruction (e.g. the multi-way branch instruction 800 as shown in FIG. 8) is inserted in the end of a first BB (e.g., the BB2) after linearization. In the linearized flow 402, the first BB is followed by the second BB, the second BB is followed by the third BB and the third BB is followed by the fourth BB.

First, the multi-way branch instruction in the end of the first BB is being executed (step S1002). When executing the multi-way branch instruction, it is further determined whether all of the threads will be genuinely activated in the third BB before any of the threads will be genuinely activated in other BBs (step S1004), and if so, the multi-way branch instruction selects the third BB as the jump target and sets the PC to the third BB for subsequent execution (step S1006). To be more specific, the multi-way branch instruction sets the PC to a starting address of the third BB such that all of the threads jump to the third BB for subsequent execution and the execution of the second BB can be skipped. Otherwise, if not all of the threads will be genuinely activated in the third BB (No in step S1004), it is further determined whether all of the threads will be genuinely activated in the fourth BB before any of the threads will be genuinely activated in other BBs (step S1008), and if so, the multi-way branch instruction selects the fourth BB as the jump target and sets the PC to the fourth BB for subsequent execution (step S1010). If not all of the threads will be genuinely activated in the third BB and not all of the threads will be genuinely activated in the fourth BB (No in step S1008), it is further determined whether none of the threads will be genuinely activated in the second BB (step S1012), and if so, the multi-way branch instruction selects the branch instruction of the second BB as the jump target and sets the PC to the address of the branch instruction of the second BB for subsequent execution (step S1014). In other words, not all of the threads will be genuinely activated in the third BB and not all of the threads will be genuinely activated in the fourth BB and none of the threads will be genuinely activated in the second BB so that the execution of the second BB can be skipped to the branch instruction of the second BB for subsequent execution. By doing so, the number of branch instructions to be executed can be reduced, thus minimizing the branch latency.

Otherwise, if at least one of the threads will be genuinely activated in the second BB (No in step S1012), the multi-way branch instruction selects the second BB as the jump target and sets the PC to the second BB for subsequent execution (step S1016). In other words, at least one of the threads will be genuinely activated in the second BB so that the execution of the second BB can't be skipped for subsequent execution.

For example, if the multi-way branch instruction is with a format as same as that of the multi-way branch instruction 800 as shown in FIG. 8, the start address of the third BB (i.e., the IFB BB) can be obtained by a summation of the current PC and the offset indicated by the JOS_F field 812. The start address of the fourth BB (i.e., the ITB BB) can be obtained by a summation of the current PC and the offset indicated by the JOS_T field 814. The address after the second BB that is the next BB of the first BB in the linearized flow can be obtained by a summation of the current PC and the offset indicated by the JOS_SKIP field 816. For example, in one embodiment, if current PC is 233 and the multi-way branch instruction 800 with a value of 650 in the JOS_T field 814, a value of 417 in the JOS_F field 812 and a value of 205 in the JOS_SKIP field 816, the start address of the fourth BB=233+650=883, the start address of the third BB=233+417=650 and the address after the second BB=233+205=438. In this example, when the execution statuses of all of the threads indicate that all of the threads will be genuinely activated in the third BB (i.e., all of the threads fail the branch condition), the multi-way branch instruction may refer to the value preset in the JOS_F field 812 and the value of current PC to selects a jump target (i.e., 650) as aforementioned and set the PC to the selected jump target such that all of the threads jump to the third BB (i.e., the BB corresponds to the selected jump target) for subsequent execution and the execution of the second BB can be skipped.

In some embodiments, the multi-way branch instruction can be simply a two-way branch instruction, wherein the two-way branch instruction may only have two jump targets. For example, the JOS_SKIP field 816 in the multi-way branch instruction 800 of FIG. 8 can be removed to form the two-way branch instruction. Taking the linearized flow 402 in the FIG. 4B as an example, when the two-way branch instruction is executed by the threads activated in the currently executed BB (i.e., the first BB), the two-way branch instruction sets the PC to a selected jump target for all of the threads according to execution status of each thread and the jump options provided by the multi-way branch instruction. To be more specific, the selected jump target is a jump target selected from the second BB, the third BB, or the fourth BB. The third BB is selected as the jump target if the execution statuses of all of the threads indicate that all of the threads will be genuinely activated in the third BB for subsequent execution. The fourth BB is selected as the jump target if the execution statuses of all of the threads indicate that all of the threads will be genuinely activated in the fourth BB for subsequent execution.

The second BB is selected as the jump target if the execution statuses of all of the threads indicate that at least one of the threads will be genuinely activated in the second BB for subsequent execution.

FIG. 11 illustrates a diagrammatic representation of a machine in the exemplary form of a computer system 1100 within which a set of instructions, for causing the machine to perform any one or more of the methodologies discussed herein, may be executed. While only a single machine is illustrated, the term "machine" shall also be taken to include any collection of machines (e.g., computers) that individually or jointly execute a set (or multiple sets) of instructions to perform any one or more of the methodologies discussed herein.

The computer system 1100 includes a processing device 1102. The processing device 1102 represents one or more general-purpose processors, and may also include one or more special-purpose processing devices. In one embodiment, the processing device 1102 is adapted or operative to perform the above-mentioned methods.

In one embodiment, the processing device 1102 is coupled to one or more memory devices such as: a main memory 1104 (e.g., read-only memory (ROM), flash memory, dynamic random access memory (DRAM), etc.), a secondary memory 1106 (e.g., a magnetic data storage device, an optical magnetic data storage device, etc.), and other forms of computer-readable media, which communicate with each other via a bus or interconnect 1112. The memory devices may also include different forms of read-only memories (ROMs), different forms of random access memories (RAMs), static random access memory (SRAM), or any type of media suitable for storing electronic instructions. In one embodiment, the memory devices may store the code and data of the compiler 210, which may be located in one or more of the locations shown as dotted boxes and labeled by the reference numeral 210. In alternative embodiments the compiler 210 may be located in other location(s) not shown in FIG. 11.

The computer system 1100 may further include a network interface device 1108. A part or all of the data and code of the compiler 210 may be transmitted or received over a network 1110 via the network interface device 1108.

In one embodiment, the computer system 1100 stores and transmits (internally and/or with other electronic devices over a network) code (composed of software instructions) and data using computer-readable media (also referred to as a machine-readable medium, a processor-readable medium, or a computer usable medium having a computer readable program code embodied therein), such as non-transitory tangible computer-readable media (e.g., magnetic, optical, or electrical storage medium including a diskette, compact disk read only memory (CD-ROM), digital versatile disc read only memory (DVD-ROM) memory device, flash memory, or similar volatile or non-volatile storage mechanism) and transitory computer-readable transmission media (e.g., electrical, optical, acoustical or other form of propagated signals—such as carrier waves, infrared signals). In one embodiment, a non-transitory computer-readable medium stores instructions of the compiler 210 for execution on one or more processors of the computer system 1100.

Therefore, according to the SIMT systems, the non-transitory computer readable storage mediums and related methods for managing a divergent control flow of a SIMT system of the invention, the SIMT system can provide simple control flow architecture using the FCC for recursive call handling to reduce the stack space needed for the recursive function call or using the multi-way branch instruction for divergences and loop control to minimize the branch latency, thus reducing the hardware cost and improving processing efficiency for divergent handling.

The embodiments of methods for managing a divergent control flow of a SIMT system that have been described, or certain aspects or portions thereof, may be practiced in logic circuits, or may take the form of program code (i.e., instructions) embodied in tangible media, such as floppy diskettes, CD-ROMS, hard drives, or any other machine-readable storage medium, wherein, when the program code is loaded into and executed by a machine, such as a smartphone, a mobile phone, or a similar device, the machine becomes an apparatus for practicing the invention. The disclosed methods may also be embodied in the form of program code transmitted over some transmission medium, such as electrical wiring or cabling, through fiber optics, or via any other form of transmission, wherein, when the program code is received and loaded into and executed by a machine, the machine becomes an apparatus for practicing the invention. When implemented on a general-purpose processor, the program code combines with the processor to provide a unique apparatus that operate analogously to application specific logic circuits.

Use of ordinal terms such as "first" and "second" in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it should be understood that the invention is not limited thereto. On the contrary, it is intended to cover various modifications and similar arrangements (as would be apparent to the skilled in the art). Therefore, the scope of the appended claims should be accorded the broadest interpretation so as to encompass all such modifications and similar arrangements.

What is claimed is:

1. A computer-implemented method of executing an instruction sequence with a recursive function call of a plurality of threads within a thread group in a Single-Instruction-Multiple-Threads (SIMT) system, the method comprising:
   providing each of the threads a function call counter (FCC), an active mask, an execution mask and a per-thread program counter (PTPC), wherein the PTPC for a specific thread indicates a target in the instruction sequence for the specific thread to be active;
   executing the instruction sequence with the recursive function call by the threads in the thread group according to a program counter (PC) indicating a target that all of the threads will jump to for subsequent execution, and
   upon executing the recursive function call, for each thread, setting the active mask according to the PTPC and the target indicated by the PC, determining the FCC when entering to or returning from a first iteration of the recursive function call, setting the execution mask according to the FCC and the active mask, and determining whether an execution result of the recursive function call takes effects according to the execution mask,
   wherein, for each thread, the execution result of the recursive function call in each iteration takes effect if the execution mask is set to a predetermined value and the execution result does not take effect if the execution mask is not set to the predetermined value.

2. The computer-implemented method of claim 1, wherein the step of determining the FCC when entering to or returning from the first iteration of the recursive function call for each thread further comprises:
   determining whether to increase the FCC according to the FCC and the active mask when entering to the first iteration of the recursive function call, wherein the FCC is increased when the active mask is equal to zero or when the FCC is greater than zero; and
   determining whether to decrease the FCC according to the FCC when returning from the first iteration of the recursive function call, wherein the FCC is decreased when the FCC is greater than zero.

3. The computer-implemented method of claim 1, wherein the step of setting, for each thread, the active mask according to the PTPC and the target indicated by the PC further comprises:
   setting the active mask to a value of one if the jump target is equal to the PTPC and setting the active mask to a value of zero if the jump target is not equal to the PTPC,
   wherein the recursive function call is determined as being executed when the active mask is set to one.

4. The computer-implemented method of claim 3, wherein the step of setting, for each thread, the execution mask according to the FCC and the active mask further comprises:
   setting the execution mask according to the active mask and a determination of whether the FCC is equal to zero,
   wherein the execution mask is set to the predetermined value when the FCC is equal to zero and the active mask is set to one and the execution mask is not set to the predetermined value when the FCC is not equal to zero or the active mask is set to zero.

5. A computer-implemented method for handling a divergent control flow in a single instruction multiple thread (SIMT) system, comprising:
   receiving a linearized flow with a plurality of basic blocks (BBs) to be executed by a group of threads within a thread group, wherein in the linearized flow a first BB is followed by a second BB, the second BB is followed by a third BB and the third BB is followed by a fourth BB and a multi-way branch instruction which provides a plurality of jump targets is inserted in an end of at least the first BB in the linearized flow; and
   executing the plurality of BBs and instructions thereof by the threads in the thread group according to a program counter (PC), wherein the PC indicates an address in the linearized flow for all of the threads within the thread group to execute next,
   wherein the multi-way branch instruction, when being executed by the threads currently activated in the first BB, selects a jump target from the plurality of jump targets provided by the multi-way branch instruction and sets the PC to the selected jump target for subsequent execution of all of the threads according to execution statuses of all of the threads and the selected jump target is the jump target selected from the second BB, the third BB, the fourth BB, or a branch instruction of the second BB.

6. The computer-implemented method of claim 5, wherein the third BB is selected as the selected jump target when the execution statuses of all of the threads indicate that: all of the threads will be genuinely activated in the third BB before any of the threads will be genuinely activated in other BBs.

7. The computer-implemented method of claim 5, wherein the fourth BB is selected as the selected jump target when the execution statuses of all of the threads indicate that: all of the threads will be genuinely activated in the fourth BB before any of the threads will be genuinely activated in other BBs.

8. The computer-implemented method of claim 5, wherein the second BB is selected as the selected jump target when the execution statuses of all of the threads indicate that: at least one of the threads will be genuinely activated in the second BB.

9. The computer-implemented method of claim 5, wherein the branch instruction of the second BB is selected as the selected jump target when the execution statuses of all of the threads indicate that: not all of the threads will be genuinely activated in the third BB, not all of the threads will be genuinely activated in the fourth BB and none of the threads will be genuinely activated in the second BB.

10. The computer-implemented method of claim 5, wherein the multi-way branch instruction is a two-way branch instruction and the selected jump target is the jump target selected from one of the second BB, the third BB and the fourth BB.

11. A single instruction multiple thread (SIMT) system, comprising:
a plurality of processors, each of the processors including vector units to provide a plurality of parallel lanes for vector execution; and
a control flow unit to schedule multiple threads to each of the processors,
wherein each of the processors is adapted to:
receive a linearized flow with a plurality of basic blocks (BBs) to be executed by a group of threads within a thread group, wherein in the linearized flow a first BB is followed by a second BB, the second BB is followed by a third BB and the third BB is followed by a fourth BB and a multi-way branch instruction which provides a plurality of jump options is inserted in an end of at least the first BB in the linearized flow; and
execute the plurality of BBs and instructions thereof by the threads in the thread group according to a program counter (PC), wherein the PC indicates an address in the linearized flow for all of the threads within the thread group to execute next,
wherein the multi-way branch instruction, when being executed by the threads currently activated in the first BB, selects a jump target from the plurality of jump options provided by the multi-way branch instruction and sets the PC to the selected jump target for subsequent execution of all of the threads according to execution statuses of all of the threads and the selected jump target is one of the jump options selected from the second BB, the third BB, the fourth BB, or a branch instruction of the second BB.

12. The SIMT system of claim 11, wherein the third BB is selected as the selected jump target when the execution statuses of all of the threads indicate that: all of the threads will be genuinely activated in the third BB before any of the threads will be genuinely activated in other BBs.

13. The SIMT system of claim 11, wherein the fourth BB is selected as the selected jump target when the execution statuses of all of the threads indicate that: all of the threads will be genuinely activated in the fourth BB before any of the threads will be genuinely activated in other BBs.

14. The SIMT system of claim 11, wherein the second BB is selected as the selected jump target when the execution statuses of all of the threads indicate that: at least one of the threads will be genuinely activated in the second BB.

15. The SIMT system of claim 11, wherein the branch instruction of the second BB is selected as the selected jump target when the execution statuses of all of the threads indicate that: not all of the threads will be genuinely activated in the third BB, not all of the threads will be genuinely activated in the fourth BB and none of the threads will be genuinely activated in the second BB.

* * * * *